United States Patent [19]

McLean

[11] 4,156,114

[45] May 22, 1979

[54] TELEPHONE NETWORK FOR VERIFYING OPERATOR-INITIATED CALLS

[75] Inventor: George E. McLean, Santa Monica, Calif.

[73] Assignee: General Telephone Company of California, Santa Monica, Calif.

[21] Appl. No.: 910,176

[22] Filed: May 30, 1978

[51] Int. Cl.² .............................................. H04M 3/64
[52] U.S. Cl. .............................................. 179/27 DA
[58] Field of Search ...................... 179/27 DA, 27 FE

[56] References Cited

U.S. PATENT DOCUMENTS

| 3,307,147 | 2/1967 | Goldman et al. .......... | 179/27 DA X |
| 4,086,439 | 4/1978 | Vowles et al. ................ | 179/27 DA |

Primary Examiner—William C. Cooper
Attorney, Agent, or Firm—John F. Lawler

[57] ABSTRACT

A network in a four-wire communication system for verifying the source of a call seeking access to restricted telephone channels through a toll switch prior to granting such access comprises handshake circuits on the operator and subscriber sides, respectively, of the toll switch in both pairs of transmission lines, the operator input to the toll switch being on a dedicated trunk. The handshake circuits comprise two D.C. verification signal sources, the first being connectable to the transmission line pair (T lines) on the subscriber side of the toll switch, and the second being connectable to the receive line pair (TR lines) on the operator side of the toll switch. The first D.C. verification signal is applied to the T lines on completion of the dialing and is detected, in accordance with this invention, on the operator side of the toll switch by a first detector connected to the T lines in the dedicated trunk. The output of this detector causes the second D.C. verification signal to be applied to the TR lines in the dedicated trunk on the operator side of the toll switch. A second detector in the TR lines on the subscriber side of the toll switch is responsive to the second verification signal to close normally open contacts in the TR lines and complete the through connection. The absence of the first detector and/or the second verification signal source as in an unauthorized access attempt with a Blue Box or the like results in open TR lines and a defeat of that attempt.

10 Claims, 9 Drawing Figures

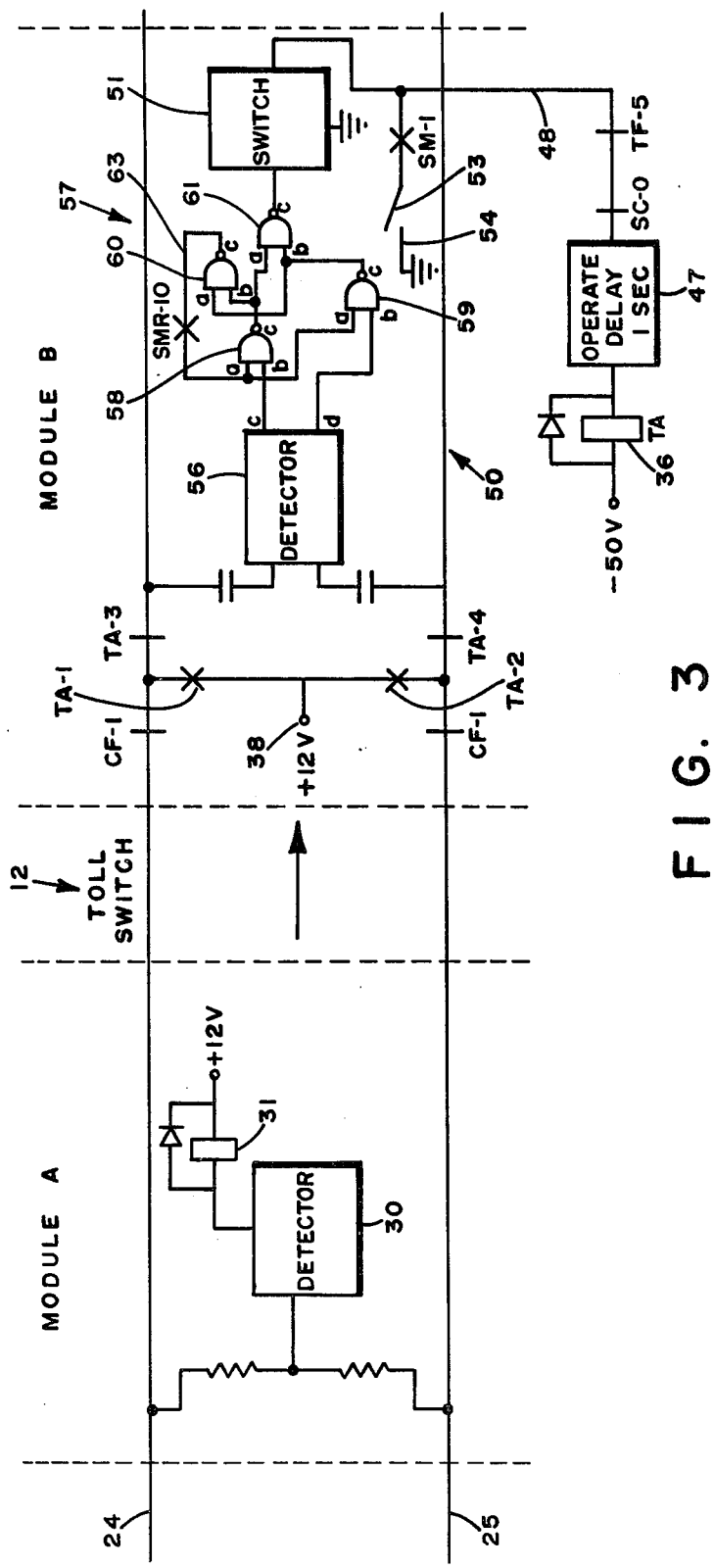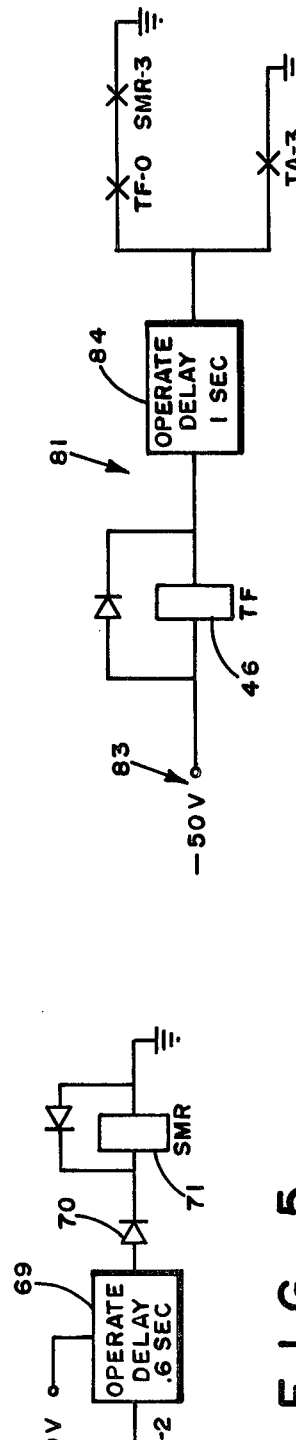
FIG. 3
FIG. 7
FIG. 5

TELEPHONE NETWORK FOR VERIFYING OPERATOR-INITIATED CALLS

BACKGROUND OF THE INVENTION

This invention relates to telephone systems and more particularly to such systems which provide authorized telephone operators access to busy subscriber circuits for verification purposes.

A verification network in a telephone system is designed to enable only an authorized telephone operator to connect through a toll switch to the telephone lines of a subscriber whose telephone is in use or appears to be in use. Such access is limited to special circumstances, such as an emergency, warranting the temporary compromise of subscriber privacy. Because of the obvious need to strictly limit such access to subscriber telephone lines to authorized telephone operators, each source of a verification call must be tested and passed upon as as a precondition to access. It is further essential that this test cannot be duplicated or simulated by unauthorized persons. This invention is directed to a network which performs this function.

A prior art technique for coping with this problem utilizes a single direction audio tone handshake signal generated by the operator and detected by a tone decoder which responds to the handshake signal for providing the desired access. Such a technique is used where a D.C. method of handshake would interfere with low impedance dial pulse and supervisory signals transmitted over transmission lines.

SUMMARY AND OBJECTS OF THE INVENTION

A general object of the invention is the provision of a telephone verification network which performs an authorization test check which cannot be defeated.

A further object is the provision of a hard wire cross office verification network which is reliable and foolproof.

Still another object is the provision of a verification network which may be used with both dial pulse and multi-frequency modes of generating called number address information.

These and other objects of the invention are achieved with a verification network in which a handshake signal is generated at the operator's dedicated trunk input to the toll switch by an authorized call and causes completion of the connection in the subscriber's input to the toll switch. The handshake is initiated at the end of dialing by a D.C. signal on one pair of the four-wire path, is completed by an independent D.C. signal on the other pair, and is effective only if completed within a predetermined time. One of the pairs of lines to the subscriber remains open in the absence of this entire handshake operation so as to prevent unauthorized access.

DESCRIPTION OF THE DRAWINGS

FIG. 3 is a schematic and block diagram showing the transmission pair of the four-wire path with circuits embodying the invention.

FIG. 5 is a block diagram of another part of the dial pulse monitoring circuit.

FIG. 7 is a block diagram of a test failure circuit.

DESCRIPTION OF PREFERRED EMBODIMENT

Figure 1:
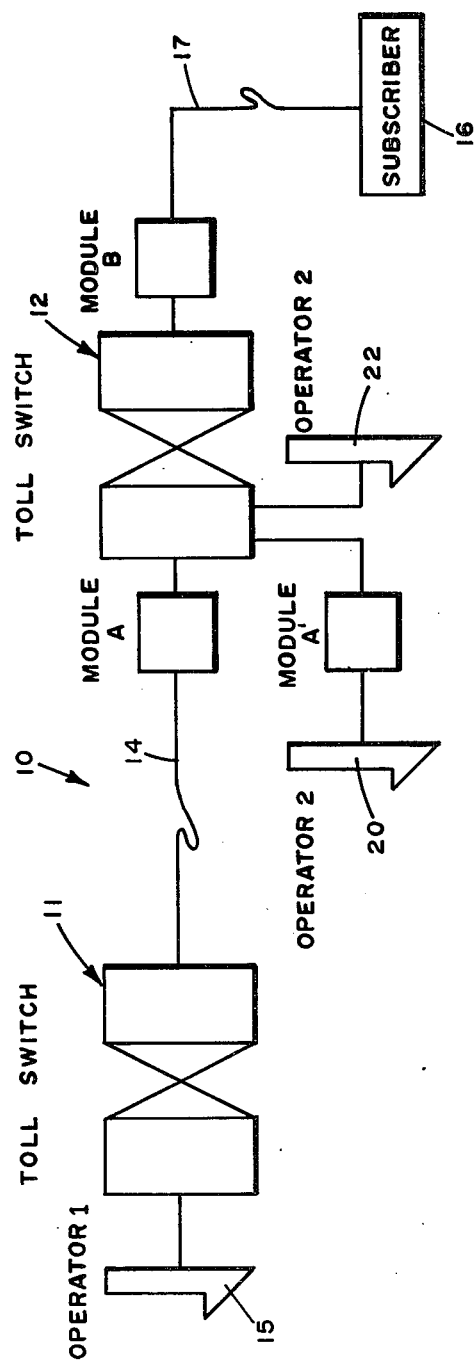
FIG. 1 is a block diagram of a telephone system illustrating the principal elements of a verification network embodying this invention as compared to connection by an unauthorized source.

Referring now to the drawings, FIG. 1 illustrates remotely spaced toll switches 11 and 12 interconnected by a dedicated trunk 14, an operator 15 connected to toll switch 11 and a subscriber 16 connected by a verification trunk 17 to the output of toll switch 12. The toll switches are characterized by a feature of inlet class of service marking which is a security technique for limiting access to the verification trunk 17 to authorized operators. Sophistication of current technology available for the design of "Blue Boxes" or similar devices intended to compromise the security of telephone systems has weakened the effectiveness of the inlet class of service marking feature of the toll switch. Accordingly, additional security is provided, in accordance with this invention, by modules A and B connected to the operator and subscriber sides, respectively, of toll switch 12. These modules contain circuits, described in detail below, which additionally check that the call seeking access to the verification trunk 17 was received on dedicated trunk 14 to which only an authorized operator has access.

In addition to the remote operator 15, a local operator 20 may be connected to the inlet side of toll switch 12 through module A' which is identical to module A and which cooperates with module B on the other side of the toll switch to insure that the request for access to the verification trunk is from the authorized source. If such access is sought by an unauthorized source, such as operator 22 connected directly to toll switch 12 without a module A', assuming this operator could defeat the security provided by the inlet class of service marking, the access to trunk 17 would be denied because of the absence of module A'.

When the distant operator 15 or local operator 20 places a verification call, toll switch 12 records, translates and processes the call based on the access and called number digits as well as the programmed class of service marking. When toll switch 12 is satisfied that the call has originated from an operator-classed inlet, it will establish a matrix connection to the outgoing verification trunk 17.

Figure 2:
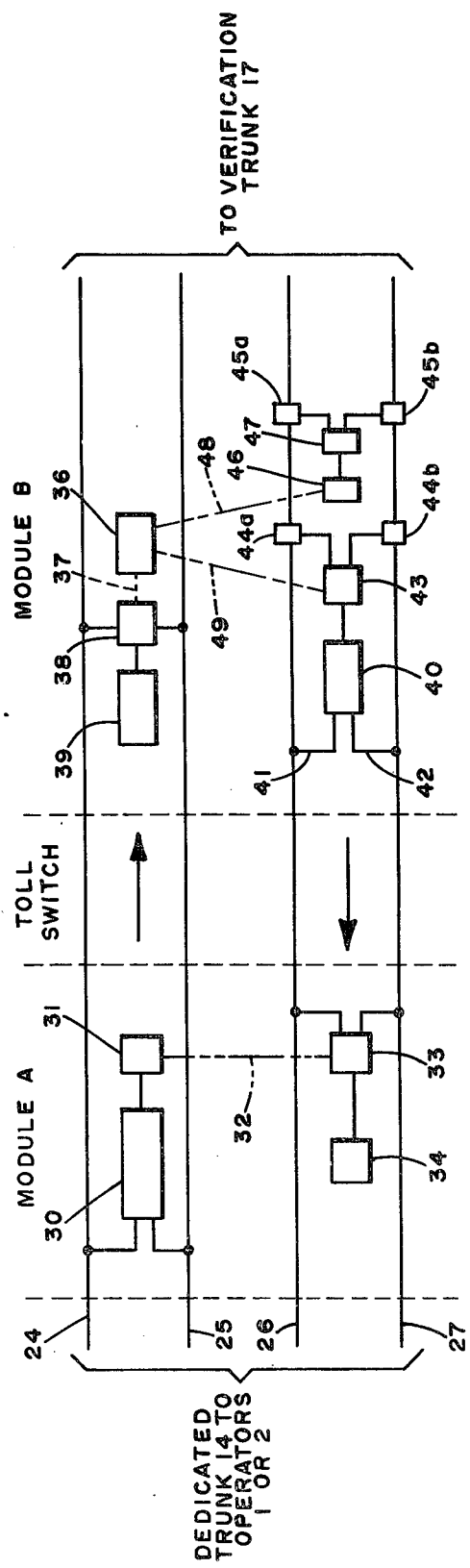
FIG. 2 is a block diagram showing details of the invention with greater particularity.

As shown in FIG. 2, the dedicated trunk 14 comprises two transmission (T) wires 24 and 25 and two receiver (TR) wires 26 and 27, the direction of transmission on each pair being indicated by the arrows. The T and TR lines are illustrated, for sake of simplicity, as extending through module A, toll switch 12, module B and form part of verification trunk 17. In accordance with this invention, module A comprises a D.C. signal detector 30 connected across wires 24 and 25 and having an output connected to relay 31. This relay is mechanically connected as indicated by the broken line 32 to a set 33 of contacts and which, when closed, connect a D.C. signal source or generator 34 to TR wires 26 and 27.

Module B comprises a relay 36 mechanically connected as indicated by the broken line 37 to contacts 38 by which a D.C. signal source 39 is electrically connected to T wires 24 and 25. When relay 36 is energized, contacts 38 are closed to apply the output of source 39 across these T wires and, conversely, when relay 36 is deenergized, source 39 is disconnected from these wires. Relay 36 is responsive to appropriate system circuits, not shown, which indicate the end of dialing by the operator and energize relay 36, thereby closing contacts 38.

Module B also contains circuits associated with TR wires 26 and 27, which circuits comprise a detector 40 connected by lines 41 and 42 across wires 26 and 27, respectively, a relay 43 connected to the output of detector 40, and normally open contacts 44a and 44b connected to the output of relay 43 and operative in response thereto to close and permit the transmission of voice signals on TR wires 26 and 27. In addition, normally closed contacts 45a and 45b are connected to TR wires 26 and 27, respectively, and are controlled by a relay 46 and a delay device 47. Relay 46 is operated in response to operation of relay 36 as indicated by the broken line 48. Contacts 45a and 45b open to block transmission of signals on TR wires 26 and 27 after the delay period of device 47 following actuation of relay 46 unless the latter is disabled by relay 36 prior to the end of that delay period.

The operation of modules A and B is now explained with reference to FIGS. 1 and 2. Authorized operator 15 dials the telephone number of subscriber 16 and this address information is transmitted by toll switch 11 and dedicated trunk 14 to module A and toll switch 12 which decodes the call and passes it to module B. Relay 36 in module B is energized by end of the dialing circuits either in module B or in toll switch 12 and closes contacts 38 to apply the D.C. verification signal from source 39 to T wires 24 and 25. Source 39 may be a 12-volt battery, by way of example. This signal is transmitted on wires 24 and 25 through the toll switch to module A and is picked up by detector 30 which responds by actuating relay 31. This closes contacts 33 and applies to TR wires 26 and 27 the second D.C. verification signal from source 34 which is transmitted through the toll switch to module B. Detector 40 in module B responds to this verification signal by operating relay 43 which closes normally open contacts 44a and 44b. This completes the communication path on TR lines 26 and 27 between the operator and the subscriber. The operation of relay 43 to close contacts 44a and 44b also deactivates relay 36 through a connection indicated in broken line 49 and in turn deenergizes relay 46. If the time between energization and deenergization of relay 46 is less than the delay period of device 47, contacts 45a and 45b remain closed; if not, these contacts open and remain open to block the communication path between the operator and subscriber.

A more detailed description of the circuits of modules A and B is now explained in conjunction with FIGS. 3-7, inclusive. In these drawings, like components are designated by like reference characters, a normally closed relay contact is designated by a short vertical line through the conductor, and a normally open contact is designated by an "X" through the conductor. For sake of clarity, no interconnection is shown between the operating relay and the contacts it controls.

Referring now to FIG. 3, relay 36, designated TA, is connected to a −50 volt power supply and through delay device 47 and line 48 to an "end of dialing" circuit indicated generally at 50. Circuit 50 is designed to respond to MF (multifrequency) dialing and comprises an electronic switch 51 which connects line 48 to ground when MF dialing has been completed. In event dial pulse (DP) mode of address information is employed, switch 53 in line 54 is closed and circuit 50 is inoperative. This enables the grounding of line 48 to be controlled by the normally open contacts SM-10 in line 54, which contacts are closed by a relay SM, described below, in response to the end of DP dialing.

The operation of the verification network begins after completion of the dialing action of the operator. If MF dialing is employed, the end of dialing is indicated by a dual frequency output of 1500 and 1700 Hz from the toll switch 12. Circuit 50 responds to this dual frequency signal by means of a detector 56 connected to wires 24 and 25 and a lock-in circuit 57, the output of which controls switch 51. Detector 56 preferably is a commercially available dual monolithic tone decoder in integrated circuit form. An example of such a detector is Model XR-2567C manufactured by Exar Integrated Systems. Circuit 57 is designed to hold the output of detector 56 sufficiently long to operate the slower-acting relays and comprises four NAND gates 58, 59, 60 and 61 connected so as to achieve this purpose. If the dual tones occur simultaneously, indicating the end of MF dialing, detector 56 senses this condition and produces 0 or "low" signal on outputs 56c and 56d. This causes outputs c of gates 58 and 59 to go high, i.e., to 1, and output c of gate 61 to go low (0). This input to switch 51 causes the latter to connect line 48 to ground and, after a 1-second delay, energization of TA relay 36. The output c of gate 60 is connected by line 63 to inputs a of gates 58 and 59, and "holds" the four gates in their existing operating states after the dual tone signal has disappeared. This connection by line 63 is controlled by normally open contact SMR-10 of relay SMR, described below; the contact remains closed while the call is being made and opens to reset the lock-in circuit 57 when the call ends.

Figure 4:
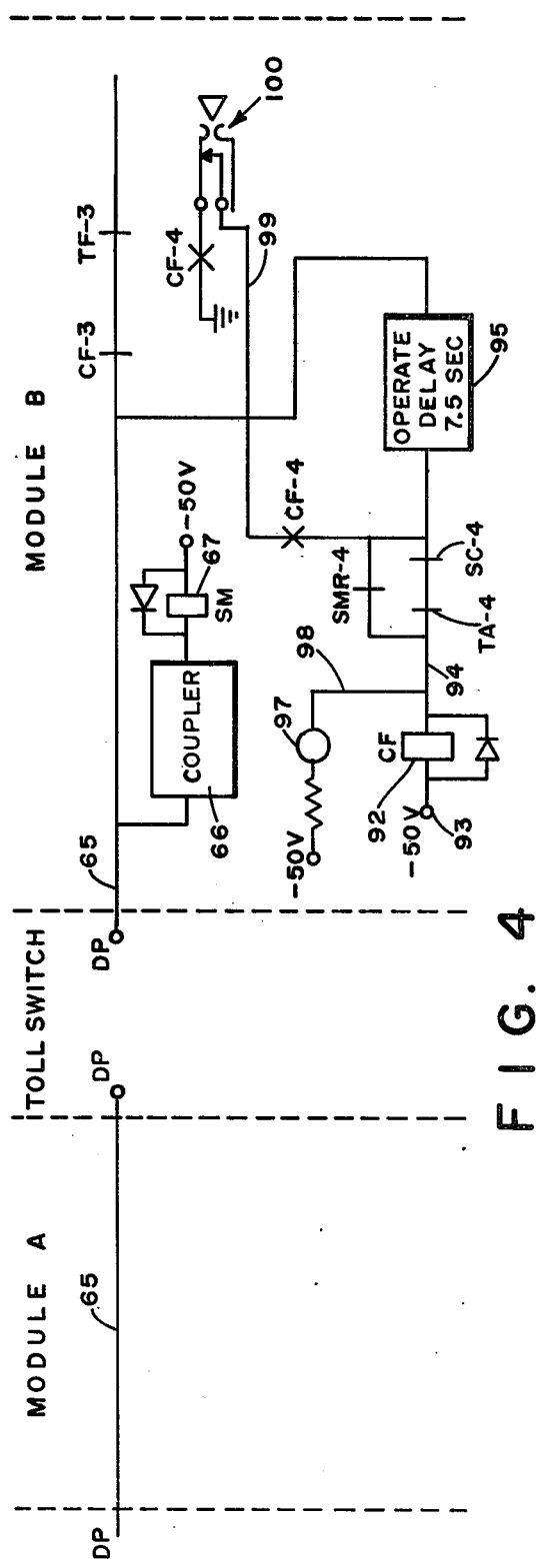
FIG. 4 is a block diagram showing the dial pulse monitoring and component failure circuits.

In event dial pulse (DP) mode of address information is employed, circuits shown in FIGS. 4 and 5 are used in conjuction with line 65 which signals the "on-hook" and "off-hook" states of the operator's telephone and transmits dial pulses through the toll switch; line 65 is connected to ground for the "off-hook" state. The "off-hook" state of line 65 is sensed by coupler 66 connected to a −50 volt power supply through relay 67 (SM) which is thereby energized. This closes normally open contact SM-2, see FIG. 5, which connects delayed action switch device 69 to ground. A −50 volt source connected to device 69 is applied to a diode 70, a relay 71 (SMR) and to ground. This delay action switch is sufficient to prevent release of SMR relay 71 between dial pulses but permits such release between interdigital pulses. The operation of the SM and SMR relays in conjunction with associated counting circuits in the toll switch constitute dial pulse monitoring and determines when the DP mode of dialing action is completed.

Upon completion of DP dialing, contact SM-1, see FIG. 3, closes and applies a ground via line 54 and closes switch 53 to TA relay 36 through delay device 47. After the period of delay of device 47 (1 second), TA relay 36 is energized. This starts the verification handshake cycle which, according to this invention, allows access to the called subscriber only to the authorized operator. While this verification is being performed, T wires 24 and 25 are opened by normally closed contacts TA-3 and TA-4, respectively, as a result of the operation of relay 36. The energization of TA relay 36 also closes normally open contacts TA-1 and TA-2 to connect D.C. source 38 to the T wires and to initiate the handshake cycle.

Figure 6:
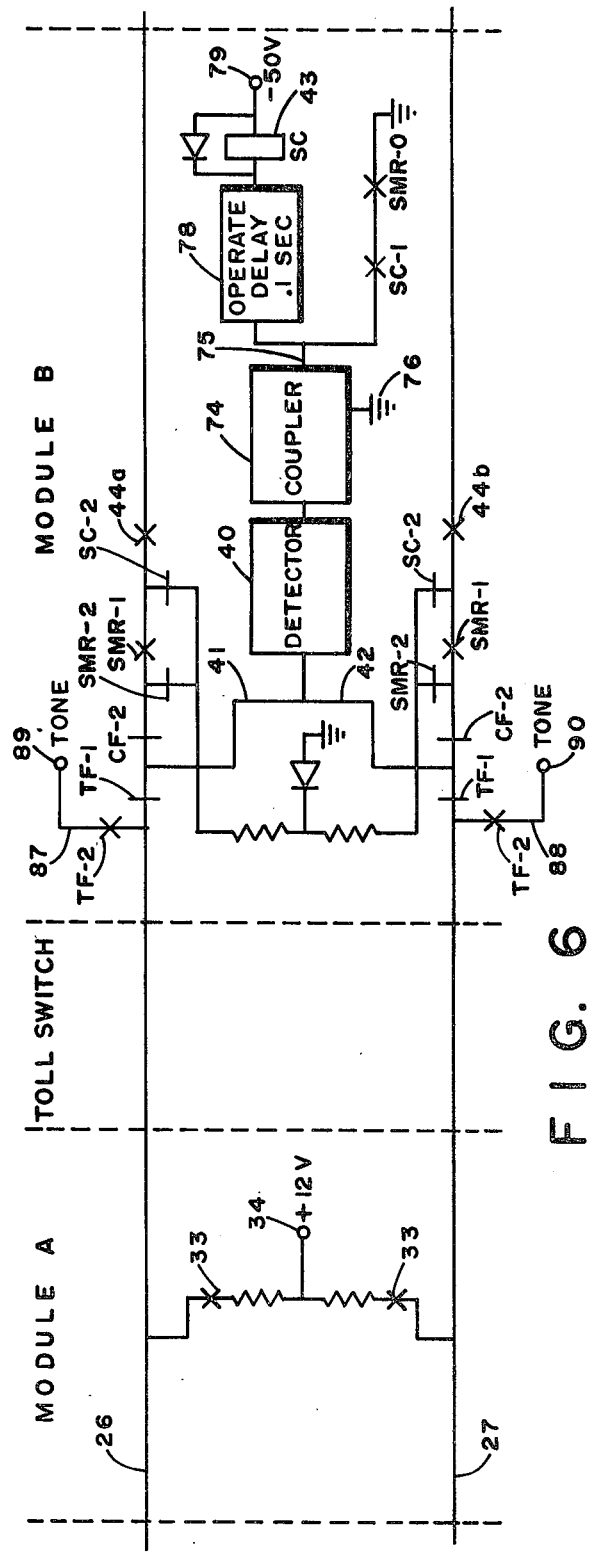
FIG. 6 is a view similar to FIG. 3 showing the receiving pair of the four-wire path with circuits embodying this invention.

The structure of module A circuits shown in FIGS. 3 and 6 are essentially the same as described above in conjunction with FIG. 2. As shown in FIG. 6, detector 40 in module B is connected to a coupler 74 with an output line 75 and which operates in response to an output from detector 40 to connect line 75 to ground 76 while isolating detector 40 from that ground. By way of example, detector 40 may be a transistor and coupler 74 an optical coupler. Output line 75 is connected through delay device 78 to a SC relay 43 (designated SC for "successful call") to which a power supply 79 is connected. Line 75 is also connected through normally open contacts SC-1 and SMR-0 to ground.

When the second verification signal on TR wires 26 and 27 is picked up by detector 40, coupler 74 is operated to connect line 75 to ground which causes the SC relay to be energized. This in turn causes contact SC-1 to close and, since contact SMR-0 was previously closed by operation of relay SMR, locks relay SC in its energized state. In addition, SC relay normally open contacts 44a and 44b in TR wires 26 and 27 are closed and, since normally open contacts SMR-1 in these wires were previously closed when SMR relay 71 was energized, the communication path between operator and subscriber through the verification network is established. The energization of the SC relay also opens normally closed contact SC-0 in line 48 of TA relay 36, see FIG. 3, causing deenergization of the TA relay and the opening of contact TA-3 (see FIG. 7) prior to the energization of TF relay 46 through the 1-second delay device 84. The TF relay is thus prevented from operating.

When the operator has completed the verification call and returns the instrument to the "on-hook" state, relays SM and SMR are deenergized and all contacts controlled by these relays return to their initial positions to reset the circuits.

In order to prevent access to trunk 17 to the subscriber and to indicate to the caller that an attempted call has not been successfully completed by the verification network when that is a fact, a test-fail circuit 81 is provided, see FIG. 7. This circuit comprises TF relay 46 connected to a power supply 83 on one side and on the other to a delay device 84 and through a normally open TA-3 contact to ground, the TA-3 contact being controlled by operation of TA relay 36, see FIG. 3. In addition, delay device 84 is connected to ground through a hold-in circuit containing normally open contacts TF-0 and SMR-3 controlled by relays 46 and 71, respectively. The period of delay device 84 preferably is about one second so that TF relay 46 is energized upon the lapse of that interval following the closing of contact TA-3, that is, at the start of the verification cycle.

TF relay 46 has normally closed contacts TF-1 in TR wires 26 and 27, see FIG. 6, and has normally open contacts TF-2 in lines 87 and 88 connected between audio tone sources 89 and 90, respectively, and the TR wires. If the handshake cycle is not completed within one second, i.e., if SC relay 43 is not energized within one second after energization of TA relay 36, TF relay 46 is energized causing TF-1 contacts to open TR wires 26 and 27 and TF-2 contacts to apply audio signals from sources 89 and 90 to the TR wires. This is a courtesy tone advising the caller that the call did not pass through the network. In addition, TF-3 contact in DP line 65, see FIG. 4, opens to prevent transmission of control signals on that line.

In order to detect and indicate a component failure in the verification network, a CF relay 92, see FIG. 4, is provided. Relay 92 is connected on one side to a power supply 93 and on the other via line 94 and delay device 95 to DP line 65. Normally closed contacts TA-4 and SC-4 in parallel with normally closed contact SMR-4 are connected in series in line 94. Delay device 95 has a relatively long delay period compared to that of TF delay device 84 and, by way of example, may be 7.5 seconds. CF relay 92 controls normally open contacts CF-1 in T wires 24 and 25, see FIG. 3, CF-2 in TR wires 26 and 27, see FIG. 6, and CF-3 in DP line 65, see FIG. 4, so that energization of the CF relay causes both pairs of the T and TR wires as well as DP line 65 to open.

The start of the delay period of device 95 begins with the end of the dialing action of the operator. If for any reason SMR relay 71 or TA relay 36 fail to operate within 7.5 seconds, CF relay 92 is energized by the grounding of line 94 to DP line 65. This opens the 4-wire communication path and additionally causes an indicator lamp 97, see FIG. 4, to be energized to signify this condition. Normally open contact CF-4 in line 99 also closes and connects CF relay 92 to ground through manual release switch 100 to hold relay 92 closed until deliberately reset manually through opening of switch 100.

Figure 8:
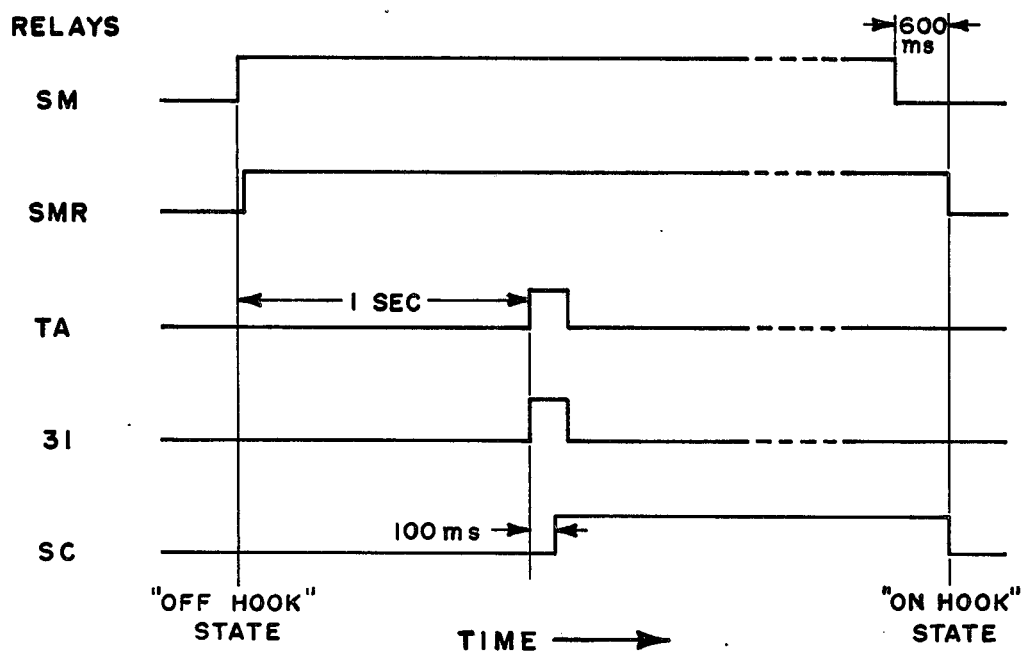
FIGS. 8 and 9 are timing diagrams illustrating the relative times of operation of the circuit components.

The timing diagram of FIG. 8 shows the relationship of operation of the principal relays of the verification network for a call placed by an authorized operator. Upon completion of the dialing action, indicated as the "off-hook" point on the time scale, relay SM is energized, SMR relay is energized 10 milliseconds later, and TA relay is energized one second after call completion. The closure of the TA relay applies the first 12-volt verification signal to T wires 24 and 25, which energizes relay 31 and causes the second 12-volt verification signal to be applied to TR wires 26 and 27 which, after a 100 millisecond delay, actuates the SC relay. This opens the TR pair and establishes the desired communication path between operator and subscriber. When the call is completed and the operator's instrument is returned on the "on-hook" state, relays SM and SMR are deenergized which also deenergizes the SC relay. The entire verification network is thus reset to its original operational state and is ready to process another verification call.

Figure 9:
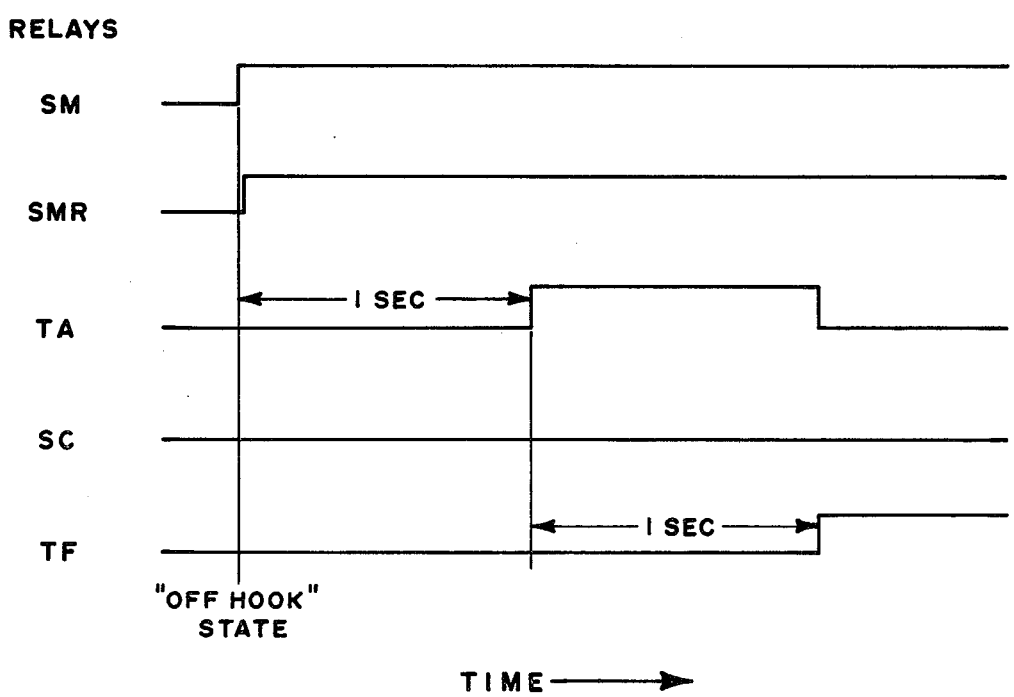

FIG. 9 is a timing diagram similar to FIG. 8 illustrating the operation of the relays for an unauthorized call. Assuming the unauthorized caller was able to defeat the screening or security feature of the toll switch, the attempted call causes energization of the SM, SMR and TA relays as described above. Since this caller, however, does not have a dedicated trunk in which module A circuits are installed, there is no second verification signal sent back to module B on TR wires 26 and 27. The absence of the latter signal for one second after energization of the TA relay results in energization of the TF relay, deenergization of the TA relay and the application of the "circuit busy" tone signal to TR wires 26 and 27.

What is claimed is:

1. A telephone network for verifying an operator-initiated call to a busy subscriber on first and second dedicated trunks across a toll switch in response to an address signal generated by the telephone instrument of the operator, said instrument having operative (off-hook) and inoperative (on-hook) states, said first and second trunks being connected to the operator and subscriber sides, respectively, of said toll switch and each comprising a first pair and a second pair of lines, said first pairs of lines providing transmission of signals from the operator to the subscriber when interconnected by said toll switch, said second pairs of lines providing transmission of signals in the opposite direction when interconnected by said toll switch, said network comprising

- a first circuit connected to the first pair of lines of said first trunk,
- a second circuit connected to the first pair of lines of said second trunk,
- a source of a first verification signal,
- first relay means in said second circuit operatively connected to said source and to the first pair of lines of said second trunk, said first relay means being responsive to said address signal to connect said source to the first pair of lines of said second trunk and applying said first verification signal thereto,
- said first circuit having first detector means responsive to said verification signal to produce an output,
- a source of a second verification signal,
- second relay means in said first trunk responsive to said first detector means output to connect said second verification signal source to said second pair of lines of said first trunk,
- a third circuit connected to the second pair of lines of said second trunk and responsive to said second verification signal to produce an output, and
- third relay means having normally open contacts in the second pair of lines of said second trunk and being responsive to the output of said third circuit to close said normally open contacts in the second pair of lines of the second trunk whereby to permit transmission of signals between the subscriber and the operator across said toll switch.

2. The network according to claim 1 in which said network also has fourth relay means with normally closed contacts connected to the second pair of lines of said second trunk, said fourth relay means comprising first delay means having a predetermined time delay interval and being responsive to said address signal to open said normally closed contacts after said interval whereby to block transmission of signals between the subscriber and the operator, and means to disable energization of said fourth relay means in response to energization of said third relay means.

3. The network according to claim 1 in which said second circuit comprises means for sensing the end of said address signal, said first relay means being operatively connected to said sensing means and being actuated thereby upon completion of the address signal.

4. The network according to claim 3 in which said first relay means comprises a relay and first and second sets of contacts connected to and operated by said relay, said first set of contacts being normally open and being connected between said source of the first verification signal and the first pair of lines of said second trunk, said relay being energized in response to the sensing of the end of the address signal by said sensing means whereby to close said first set of contacts and connect said source of the first verification signal to the first pair of lines of said second trunk.

5. The network according to claim 4 with said second set of contacts being normally closed and being connected in the first pair of lines of said second trunk on the subscriber side of the connection of the first verification signal source to the first pair of lines of said second trunk, said second set of contacts being opened in response to energization of said relay whereby to disconnect the first pair of lines of said second trunk from said subscriber during operation of the verifying network.

6. The network according to claim 4 in which said third relay means has a normally closed contact connected in series with said relay of the first relay means whereby operation of said third relay means (successful call) causes deenergization of said relay, said first relay means having a normally open contact connected to said fourth relay means whereby deenergization of said relay disables energization of said fourth relay means.

7. The network according to claim 2 in which said toll switch has relay enabling means, said toll switch being responsive to the off-hook and on-hook states of said operator instrument for changing said enabling means between active and inactive states, respectively, fifth relay means having normally closed contacts in the first and second pairs of lines of said second trunk and comprising second delay means having a predetermined time delay interval greater than said delay interval of said first delay means, and said fifth relay means being connected to said enabling means and being energized upon change of the latter to the active state to open said normally closed contacts thereof after the longer of said delay intervals whereby to open the first and second pairs of lines of said second trunk and to block transmission of signals thereon.

8. The network according to claim 7 with means for locking said fifth relay means in the energized state, indicator means connected to said fifth relay means and operative to indicate the energized state thereof.

9. The network according to claim 8 with manual means for releasing said locking means and deenergizing said fifth relay means.

10. The network according to claim 7 in which said fifth relay means comprises a relay operatively connected to the associated contacts for opening and closing same, said third relay means having normally closed contacts interconnecting said relay and said second delay means whereby energization of the relay of said fifth relay means is prevented when the normally open contacts of the third relay means are closed.

* * * * *